United States Patent Office 3,100,738
Patented Aug. 13, 1963

3,100,738
UNIFORM RELEASE PROCESS
Chester John Cavallito, Decatur, Ill., assignor to Neisler Laboratories, Inc., Decatur, Ill., a corporation of Delaware
No Drawing. Continuation of application Ser. No. 396,751, Dec. 7, 1953. This application Aug. 9, 1961, Ser. No. 130,261
1 Claim. (Cl. 167—82)

This invention relates to a pharmaceutical mixture and is more particularly concerned with a combination of ingredients which, when combined with a therapeutically-active material and tableted or encapsulated, will slow down the release of the active ingredients of an oral pharmaceutical preparation.

In the oral administration of certain types of therapeutically-active materials, it oftentimes is desirable to have a composition which will slow the release of the active ingredients into the gastro-intestinal tract to provide a more uniform rate of absorption, for two main reasons: (a) a larger dose may be administered which will maintain a predetermined level of activity in the system, and (b) effective results may be obtained wherein a few capsules or tablets are administered daily as contrasted with rigid short time requirements for incremented administration of certain tablets in order that an effective activity level may be maintained.

Prior to the provisions of the invention herein described and claimed, it has been proposed to utilize layered capsules or tablets, the respective layers of which have variable disintegration rates. Thereby, it is hoped that a therapeutic level of active ingredients may be maintained over a longer period of time. However, utilizing this system, very careful compounding is required, and the art of encapsulating or tableting has less satisfactorily accomplished in practice what was envisioned in theory. It has additionally been proposed to provide a tablet containing a substantial proportion of a neutral gum, such as methyl cellulose, guar gum, psyllium, et cetera, and utilizing the neutral gum's swelling and dispersing action, thereby to prolong the rate of distribution of the active ingredients into the stomach. Accurate and effective control of the rate of release of the therapeutic ingredients utilizing such neutral gums is difficult, since many factors affect the swelling and disintegration rates of the tablets. While the above theories are the principal ones which have been adopted to allow the slow rate of utilization of active materials when administered orally, there have been many other solutions for this problem proposed and tried. None has accomplished the degree of regulated giving-off of active material that is desired.

It is, therefore, a principal object of the present invention to provide a tablet or capsule for oral administration containing an active ingredient which is slowly released at a fairly uniform rate and over a prolonged period when in the gastro-intestinal tract. A further object of the present invention is to provide such a tablet which utilizes a new principle to accomplish this result. Another object of the present invention is to provide a therapeutic capsule or tablet containing a therapeutically-active ingredient, a polyanionic high-molecular-weight, polycarboxylic-acid-containing, competing material and methyl cellulose or other neutral gum. Still a further object of the present invention is to provide such a tablet which may be readily compounded and which provides a uniform release rate of the active ingredients. A specific object of the present invention is to provide a new tablet containing amphetamine phosphate, pectic acid, a neutral gum or excipient and caffeine. Other objects will become apparent hereinafter.

It has now been found and is herein first disclosed that a therapeutically-active ingredient may be compounded with a combination of a neutral gum and a polyanionic high-molecular-weight, polycarboxylic acid-containing, competing material to accomplish the above objects. Representative examples of polyanionic, high-molecular-weight, polycarboxylic acid-containing, competing materials which are suitable for the purposes of the present invention include, for example, pectic acid, pectinic acid, tannic acid, and suitable cation exchange resins containing at least some free carboxylic acid groups, such as, for example, Amberlite IRC–50 (Rohm and Haas) which has a milli-equivalent of ten per gram and 4.20 per milliliter, Alkalex (Research Products) which has a milli-equivalent of 4.95 per gram and 1.80 per milliliter, Duolite DS–100 (Chemical Process) which has a milli-equivalent of 3.85 per gram and 1.11 per milliliter, Permutit H (Permutit) which has a milli-equivalent of 5.30 per gram and 1.70 per milliliter, Wofatite C (I. G. Farben) which has a milli-equivalent of 7.00 per gram and 2.50 per milliliter et cetera. While I do not desire to be limited by a particular mechanism of action, it is believed that the outstanding peculiarity of the presently described tablet or capsule is due to an action of competition. Thus, when the active ingredient is combined with a free carboxylic acid containing material in a tablet or capsule, and the same starts to disintegrate in the stomach, the carboxylic acid radicals will compete with the materials of the stomach and intestine for the active ingredient. To clarify, when amphetamine phosphate, or other physiologically-active material is orally administered, it is subjected to the mechanism of the stomach and intestinal tract, whereby the active ingredient is absorbed into the human system. However, if free carboxylic acid groups are present, the active ingredient being reactive with the free carboxylic groups, a certain amount of the active ingredient will be taken on to the polyanionic material containing the free carboxylic radicals to form a polyanionic complex. However, as the polyanionic complex continues to pass through the digestive system, it will be gradually decomposed or by an ionic exchange mechanism allow a release of the active ingredient into the system. It will thus be seen that a slow regulated absorption of the active material into the system is achieved.

A specific embodiment of the present invention contemplates that the active ingredient will be reacted with the polyanionic molecule prior to compounding, thereby to form a complex, which is the same complex formed in situ as described above. It will thus be seen that the mechanism of action of both systems are substantially the same.

Therapeutically-active ingredients which are suitable in the composition, capsule and/or tablet of the present invention include materials having a basic-type reactive group in their chemical composition, i.e., an amino or ammonium nitrogen. Representative therapeutically-active ingredients include, for example, amphetamine, synephrine, antihistaminics of the normal dialkylaminoalkyl configuration, antispasmodics containing an amino group, hexamethonium bromide and related ammonium compounds, alkaloid material containing an amino group, Veratrum alkaloid, atropine, homatropine, et cetera. If a basic amino group is present the active ingredient will afford sufficient basicity to be operative as above-described. The active ingredient may be employed, either as a free amine or as a low molecular weight acid addition salt, i.e., wherein the anionic portion of the molecule has a molecular weight below about 255. Quaternary ammonium salts are also operative, because they also are susceptible to the same mechanism of action.

Since the rate of release of the therapeutically-active ingredient is appreciably slowed down by the compounding as described by the present invention, rather larger amounts thereof than are normally used may be employed with safety utilizing the technique of the present invention. Therefore, there is little criticality in the amount of active ingredient which is employed. However, since the release rate of the active ingredient is directly dependent upon the amount and kind of polyanionic material which is employed, it is desired that a weight at least equivalent to the amount of active ingredient be also utilized. I have found that when quantities greater than about twenty times the quantity of therapeutically-active ingredient of the polyanionic material are employed, the rate of release is slowed down so considerably as to substantially make the active ingredient unavailable to the system. It is contemplated that six times the amount of polyanionic material based on the amount of active therapeutic ingredient constitutes an optimum amount thereof. A preferred embodiment of the present invention contemplates that a neutral gum having a swelling and dispersing action, such as, for example, methyl cellulose, guar gum, psyllium, locust bean gum, quince seed mucilage, linseed mucilage, Iceland Moss mucilage, et cetera, will also be employed in conjunction with the two foregoing materials, to prevent an instant disintegration of the tablet upon administration. Since the competitive action hereinbefore described does not instantly take place, but rather takes some time, the inclusion of methyl cellulose allows the competitive action hereinbefore described to occur more effectively than when it is not included.

The amount of neutral gum employed will also affect the release rate of the active ingredient, and the amount employed will vary from about double that of the active ingredient used to approximately twenty times that amount of active ingredient used. It is also contemplated that conventional tableting materials, such as starch, sugar, dicalcium phosphate, calcium carbonate, magnesium carbonate, talcum, et cetera, may be added to the mixture to give desired size, bulk, color, texture, buffering et cetera.

Specifically, an example of the composition of the present invention may be illustrated by a mixture comprising:

| | | |
|---|---|---|
| d-Amphetamine salt | milligrams | 2 to 8 |
| Methyl cellulose | grains | 1 to 3 |
| Pectic acid | do | 0.3 to 1 |
| Dicalcium phosphate | do | 0 to 2 |

A specific example of the type of composition of the present invention comprises:

| | | |
|---|---|---|
| D-Amphetamine dibasic phosphate | milligrams | 5.0 |
| Pectic acid | grains | 0.5 |
| Methyl cellulose | do | 2.0 |
| Starch | do | 0.5 |

This mixture is intimately mixed and run in a conventional type tableting machine to punch a tablet. Thereafter, a coating of 2.5 grains of caffeine was added thereto. The result was an appetite-depressant and mood-elevation agent having an effective time up to about six hours.

Various modifications may be made in the method and compounds of the present invention without departing from the spirit or scope thereof, and it is to be understood that I limit myself only as defined in the appended claim.

This application is a continuation of my copending application Serial 396,751 filed Dec. 7, 1953, now abandoned.

I claim:

The process which comprises: orally administering a therapeutically active agent in the form of a tannic acid salt thereof in combination with a non-toxic, polyanionic, high-molecular-weight, polycarboxylic acid-containing material of which the carboxylic acid radicals compete with the materials of the gastrointestinal tract for the active ingredient, whereby a substantially uniform release-rate of the active ingredient into the system is achieved.

References Cited in the file of this patent

UNITED STATES PATENTS

| | | |
|---|---|---|
| 1,183,055 | Werner | May 16, 1916 |
| 2,055,083 | Klein | Sept. 22, 1936 |
| 2,100,054 | Hopkinson et al. | Nov. 23, 1937 |
| 2,207,185 | Wilson | July 9, 1940 |
| 2,321,043 | Rockwell | June 8, 1943 |
| 2,372,116 | Pierce et al. | Mar. 20, 1945 |
| 2,399,742 | Jones et al. | May 7, 1946 |
| 2,481,804 | Whittingham | Sept. 13, 1949 |
| 2,498,687 | Larsen | Feb. 28, 1950 |
| 2,540,302 | Stecher et al. | Feb. 6, 1951 |
| 2,555,364 | Owens et al. | June 5, 1951 |
| 2,656,298 | Loewe | Oct. 20, 1953 |
| 2,677,670 | Kunin et al. | May 4, 1954 |
| 2,891,891 | Welin et al. | June 23, 1959 |
| 2,920,015 | Thompson | Jan. 5, 1960 |
| 2,950,309 | Cavallito | Aug. 23, 1960 |
| 2,963,404 | Hammer et al. | Dec. 6, 1960 |

FOREIGN PATENTS

| | | |
|---|---|---|
| 133,001 | Australia | June 2, 1949 |
| 1,031,467 | France | June 24, 1953 |
| 214,149 | Australia | Mar. 24, 1958 |

OTHER REFERENCES

Amer. Journ. Phar., February 1942, p. 62 and p. 63.

Rosenthal: Public Health Reports, vol. 57, No. 51, Dec. 18, 1942, pp. 1923–1935.

Drug and Cosmetics Industry; April 1950; page 453, "Amphetamine Tablets."

Science News Letter, Oct. 4, 1947, page 210.

Cavallito et al.: "Modification of Rates of Gastrointestinal Absorption of Drugs (I), Amines," J. Am. Pharm. Assoc., Sci. Ed., vol. 47, No. 3, pp. 165–173, March 1958.

Garrett: "Tanphetamin, A New Amphetamine Salt," Clinical Medicine, vol. 3, pp. 1185–1188, December 1956.